(No Model.)

W. VAN WYCK.
MOWER.

No. 353,993. Patented Dec. 7, 1886.

Witnesses
T. W. Fowler
H. B. Applewhaite

Inventor
Wm Van Wyck
By his Attorneys
A. H. Evans

UNITED STATES PATENT OFFICE.

WILLIAM VAN WYCK, OF NEWARK, NEW JERSEY, ASSIGNOR OF ONE-HALF TO H. A. HUDSON, OF SAME PLACE.

MOWER.

SPECIFICATION forming part of Letters Patent No. 353,993, dated December 7, 1886.

Application filed May 20, 1886. Serial No. 202,725. (No model.)

*To all whom it may concern:*

Be it known that I, WILLIAM VAN WYCK, of Newark, in the county of Essex and State of New Jersey, have invented a new and useful Improvement in Mowers, of which the following is a full, clear, and exact description, reference being had to the accompanying drawings, forming part of this specification, in which—

Figure 1:
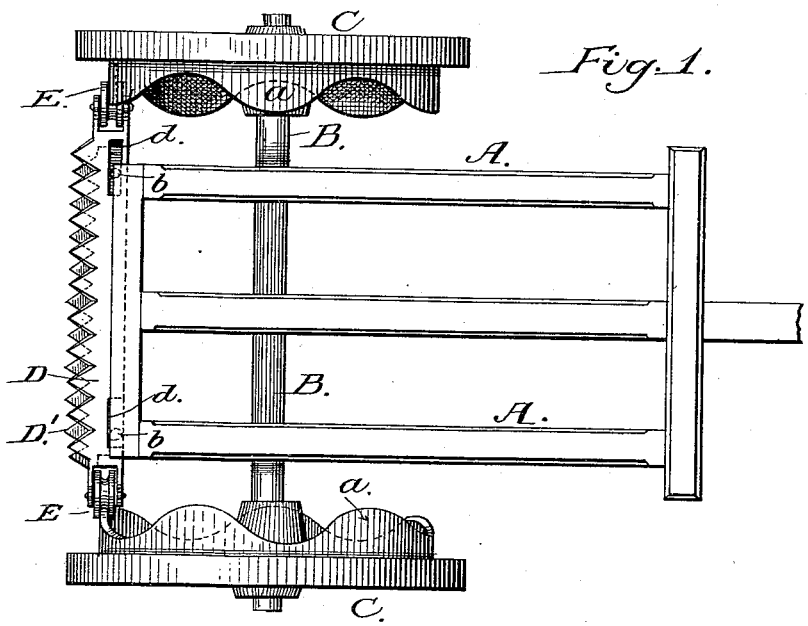
Figure 2:
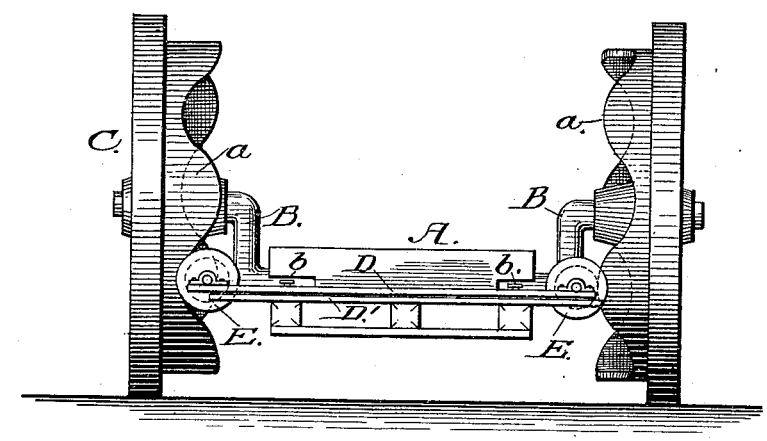

Figure 1 is a plan view of a mower with my improvements attached. Fig. 2 is a front view of the same.

My invention relates to mowing-machines; and it consists in the combination of the devices hereinafter explained and claimed.

To enable others skilled in the art to make and use my invention, I will proceed to describe the manner in which I have carried it out.

In the drawings, A represents the framework of the machine, B the axle, and C C the wheels. These wheels are constructed with a flange, *a*, on the inside, extending out at right angles to the plane of the wheels and within the periphery of the wheels, as shown in Figs. 1 and 2. The faces of the flanges *a* are cut into sinuous curves, each presenting a series of cams, the projecting portions of one series of cams being opposite the depressed portions of the other series. Between these two series of cams is placed the reciprocating cutter-bar D, provided with the slots *d*, to allow the bar D a lateral or reciprocating motion between the wheels. Through these slots are placed the retaining-pins *b*, to hold the bar in its proper position as it reciprocates.

On each end of the reciprocating cutter-bar I journal the friction-rollers E, to bear directly against the two series of cams, as shown in Fig. 2. It is evident that by this construction I am enabled to give the cutter-bar D a reciprocating motion without the intervention of cogs, arms, or levers of any kind, thus greatly simplifying and cheapening the construction of mowers.

Below the reciprocating cutter-bar I place the stationary cutter-bar D', fixed rigidly to the frame A in any convenient manner.

I am aware that it is not new to reciprocate cutter-bars by means of cams or cam-grooves, nor do I claim such, broadly, as my invention.

I am also aware that a single centrally-placed wheel having a cam-surface upon each side has been heretofore used in connection with centrally-placed anti-friction rollers, whereby a cutter has been reciprocated. I am further aware that a mowing-machine has been provided with a bar sliding in boxes at the front of the machine and alternately driven from side to side by teeth on the inside of the riding-wheels, said bar being connected with a lever, which in turn is connected with and communicates motion to the cutter-bar. These features I do not, therefore, broadly claim as my invention, but limit myself to the construction and combination claimed, whereby the cutter-bar is connected directly with the cam-wheels and receives a positive motion therefrom.

Having thus explained my invention, what I claim, and desire to secure by Letters Patent, is—

An improved mower, comprising the frame A, the wheels C upon opposite sides of the frame and provided with inwardly-projecting flanges *a*, said flanges having a cam-surface, as described, a cutter-bar fixed rigidly to the frame A, a reciprocating cutter-bar, D, having the slots *d*, the pins *b* passing through said slots, and the rollers E, journaled loosely upon each end of the reciprocating cutter-bar and engaging the cam-flanges, substantially as herein described.

WILLIAM VAN WYCK.

Witnesses:
HARRY L. HUDSON,
ANDREW G. BEERSTROM.